United States Patent
Gnebner et al.

(10) Patent No.: US 10,683,921 B2
(45) Date of Patent: Jun. 16, 2020

(54) DIFFERENTIAL LOCK ACTUATION AND CONTROL

(71) Applicant: THOMSON INDUSTRIES, INC., Wood Dale, IL (US)

(72) Inventors: Peter Gnebner, Glimåkra (SE); Håkan Persson, Kristianstad (SE)

(73) Assignee: THOMSON INDUSTRIES, INC., Wood Dale, IL (US)

( * ) Notice: Subject to any disclaimer, the term of this patent is extended or adjusted under 35 U.S.C. 154(b) by 193 days.

(21) Appl. No.: 15/913,075

(22) Filed: Mar. 6, 2018

(65) Prior Publication Data
US 2018/0259050 A1    Sep. 13, 2018

Related U.S. Application Data

(60) Provisional application No. 62/468,777, filed on Mar. 8, 2017.

(51) Int. Cl.
*F16H 48/34* (2012.01)
*F16H 25/20* (2006.01)

(52) U.S. Cl.
CPC ......... *F16H 48/34* (2013.01); *F16H 25/2015* (2013.01); *F16H 2025/204* (2013.01); *F16H 2025/2081* (2013.01); *F16H 2048/343* (2013.01)

(58) Field of Classification Search
CPC ............... F16H 2048/346; F16H 48/34; F16H 2048/343; F16H 25/2015; F16H 2025/2081
See application file for complete search history.

(56) References Cited

U.S. PATENT DOCUMENTS

| | | | | |
|---|---|---|---|---|
| 4,425,814 A | * | 1/1984 | Dick | F16H 63/304 192/109 A |
| 4,440,035 A | * | 4/1984 | Foulk | F16D 28/00 464/46 |
| 4,498,350 A | * | 2/1985 | Ross | F16H 63/304 192/109 A |
| 4,793,458 A | * | 12/1988 | Shealy | F16H 63/304 192/141 |
| 5,267,635 A | * | 12/1993 | Peterson | F16D 48/064 192/84.6 |
| 5,673,777 A | * | 10/1997 | Ziech | F16H 48/08 192/108 |
| 6,503,167 B1 | * | 1/2003 | Sturm | F16H 48/22 192/84.6 |
| 6,582,334 B1 | * | 6/2003 | Noll | F16H 48/08 475/86 |

(Continued)

FOREIGN PATENT DOCUMENTS

FR    3062190 A1 *   7/2018   ........... F16H 61/32

*Primary Examiner* — Terence Boes
(74) *Attorney, Agent, or Firm* — Moreno IP Law LLC

(57) ABSTRACT

An actuator for a differential lock includes an actuator pin that is resiliently coupled to a lead screw to prevent excess force on the actuator pin under otherwise damaging conditions, such as a tooth-on-tooth state of the differential. The actuator may include sensors for sensing the position of a lead screw nut and sensors for sensing the position of the actuating pin to provide improved control by sensing multiple states of the actuator, including a state in which a tooth-on-tooth condition is present in the differential.

14 Claims, 11 Drawing Sheets

(56) References Cited

U.S. PATENT DOCUMENTS

| | | | | |
|---|---|---|---|---|
| 8,291,783 | B2* | 10/2012 | Shi | E05F 15/622 |
| | | | | 74/89.39 |
| 9,500,224 | B2* | 11/2016 | Asher | F16C 29/0692 |
| 10,415,681 | B2* | 9/2019 | Molde | H01H 3/16 |
| 10,422,302 | B2* | 9/2019 | Himmelmann | F16H 25/2021 |
| 2004/0050643 | A1* | 3/2004 | Krzesicki | F16D 25/083 |
| | | | | 192/70.23 |
| 2006/0046888 | A1* | 3/2006 | Puiu | B60K 17/16 |
| | | | | 475/151 |
| 2015/0053027 | A1* | 2/2015 | Downs | F16H 63/304 |
| | | | | 74/15.4 |
| 2017/0130815 | A1* | 5/2017 | Wang | F16H 48/22 |
| 2019/0309774 | A1* | 10/2019 | Mezzino | F15B 15/24 |

* cited by examiner

DIFFERENTIAL LOCK ACTUATION AND CONTROL

PRIORITY CLAIM AND REFERENCE TO RELATED APPLICATION

This application claims priority and benefit under all applicable laws, treaties and regulations, to U.S. provisional application Ser. No. 62/468,777 filed on Mar. 8, 2017, titled "Electrical Actuator for Differential Locking System." The subject matter of this document is incorporated herein by reference in its entirety.

BACKGROUND

1. Technical Field

The disclosure relates generally to actuators and more specifically to actuators that are suitable for providing motive force to locking elements on differential transmissions. The disclosure also relates to systems for controlling actuators.

2. Prior Art

Vehicles may employ differential transmissions to control respective speed and torque of each one of a pair of driven axle shafts under various driving conditions. When a vehicle moves in a straight path, the wheels turn at approximately the same speed and the torque is equally split between both wheels. When the vehicle turns, the outer wheel must travel over a greater distance than the inner wheel. Differential transmissions or "differentials" provide for torque and speed control of each wheel, permitting the inner wheel to turn at a slower speed than the outer wheel as the vehicle turns.

Under some driving conditions, such as slippery road conditions, control of the vehicle may be compromised by the function of the differential, which may tend to transfer the most torque to a spinning or slipping tire, leaving a non-spinning wheel without power and thus preventing forward motion of the vehicle.

The prior art has developed locking differentials in response to the aforementioned problem. Locking differentials may be selectively configured from an "unlocked" operational mode, in which the differential functions normally and the wheels are permitted to rotate at different speeds relative to one another, to a "locked" mode, in which both wheels rotate as though driven on a common shaft. The term "locked" may also refer to a state in which different—not necessarily equal—amounts of driving torque are applied to each respective wheel. Locking differentials improve traction of the vehicle under slippery road conditions by permitting some torque to be applied to a non-slipping wheel when another of the wheels undergoes slip on surface. Differential locking mechanisms typically employ an actuator to engage the locking mechanism. These actuators may be controlled manually or automatically by a vehicle controls system.

The prior art suffers from a number of disadvantages. For example, prior art actuators include hydraulic systems that contribute significantly to the physical size of the actuator itself as well as the impact on the overall vehicle cost and weight of hydraulic components. In addition, prior art actuators do not offer very compact configurations while providing a robust array of capabilities and safety.

Still further, prior art actuators have rather rudimentary sensing capabilities for the actuator status, being limited typically to two-state sensing (i.e., engaged or disengaged states) of the actuator, if any, with corresponding limitations on the control and safety that such actuators may offer. For example, during a locking operation, a differential may experience a tooth-on-tooth state where the power transmission components are not suitably meshed. Applying force to the locking mechanism under these circumstances may damage the components or cause unsafe conditions. Prior art actuators and control systems that employ them are thus limited in their control of differential locking and preventing damage or unsafe conditions.

Prior art actuators typically lack the ability to integrate with existing onboard communication and control capabilities of vehicles. Many vehicles today utilize a data bus, such as a CAN-BUS or LIN-BUS to enable communication with and control of onboard subsystems. Such systems eliminate the need for separate and independent conductor sets (wires) and control infrastructure for each component. However, prior art differential locking actuators typically require their own controls, such as relay systems. It would be desirable to provide differential locking actuators which provide for integration with vehicle onboard systems and eliminate the need for additional or separate control components, while providing for more robust control.

There is thus a need for actuators and control systems therefore which address the aforementioned shortcomings and others in the prior art.

SUMMARY

According to one aspect of the disclosure, an example actuator for a differential lock may include a compact configuration that utilizes electromechanical components, including an electric motor, and lead screw drive assembly for driving an actuator pin configured to cooperate with the differential lock.

According to an aspect of the disclosure, the actuator pin may be resiliently coupled to the lead screw to prevent excess force on the actuator pin under otherwise damaging conditions, such as a tooth-on-tooth state of the differential.

According to another aspect an electromechanical actuator may include sensors for sensing the position of a lead screw nut and sensors for sensing the position of an actuating pin. The sensors may provide improved control by sensing multiple states of the actuator, including a state in which a tooth-on-tooth condition is present in the differential.

According to another aspect of the disclosure, electromechanical actuators may be provided with manual or automatic failsafe features to provide for the disengagement and unlocking of the differential lock when a power loss occurs.

DESCRIPTION OF THE DRAWINGS

The above and other attendant advantages and features of the invention will be apparent from the following detailed description together with the accompanying drawings, in which like reference numerals represent like elements throughout. It will be understood that the description and embodiments are intended as illustrative examples and are not intended to be limiting to the scope of invention, which is set forth in the claims appended hereto. The following FIGURES depict example devices according to aspects of the disclosure.

DETAILED DESCRIPTION

Figure 1:
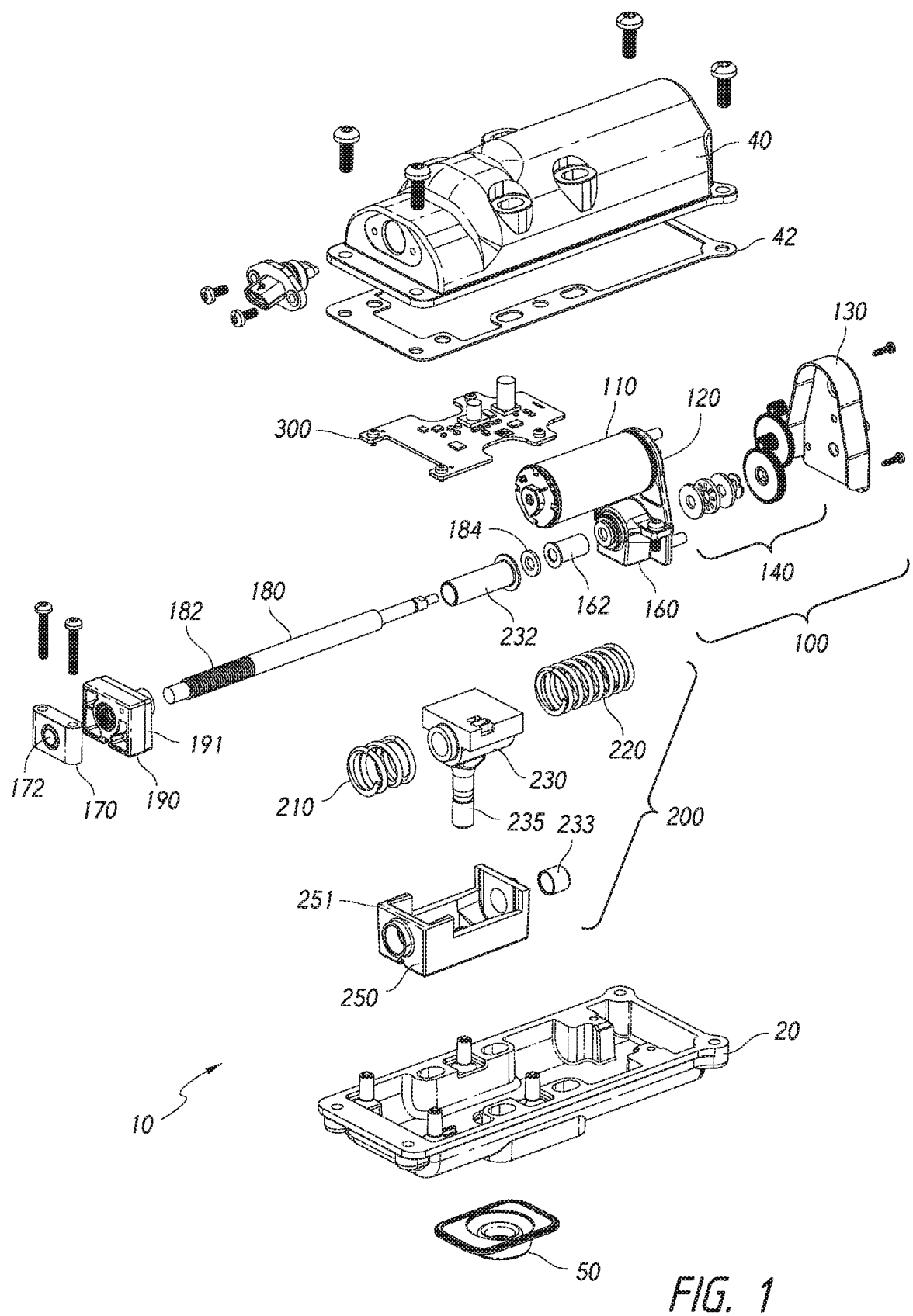
FIG. 1 is an exploded perspective view from an upper vantage point of an example actuator.
Figure 2:
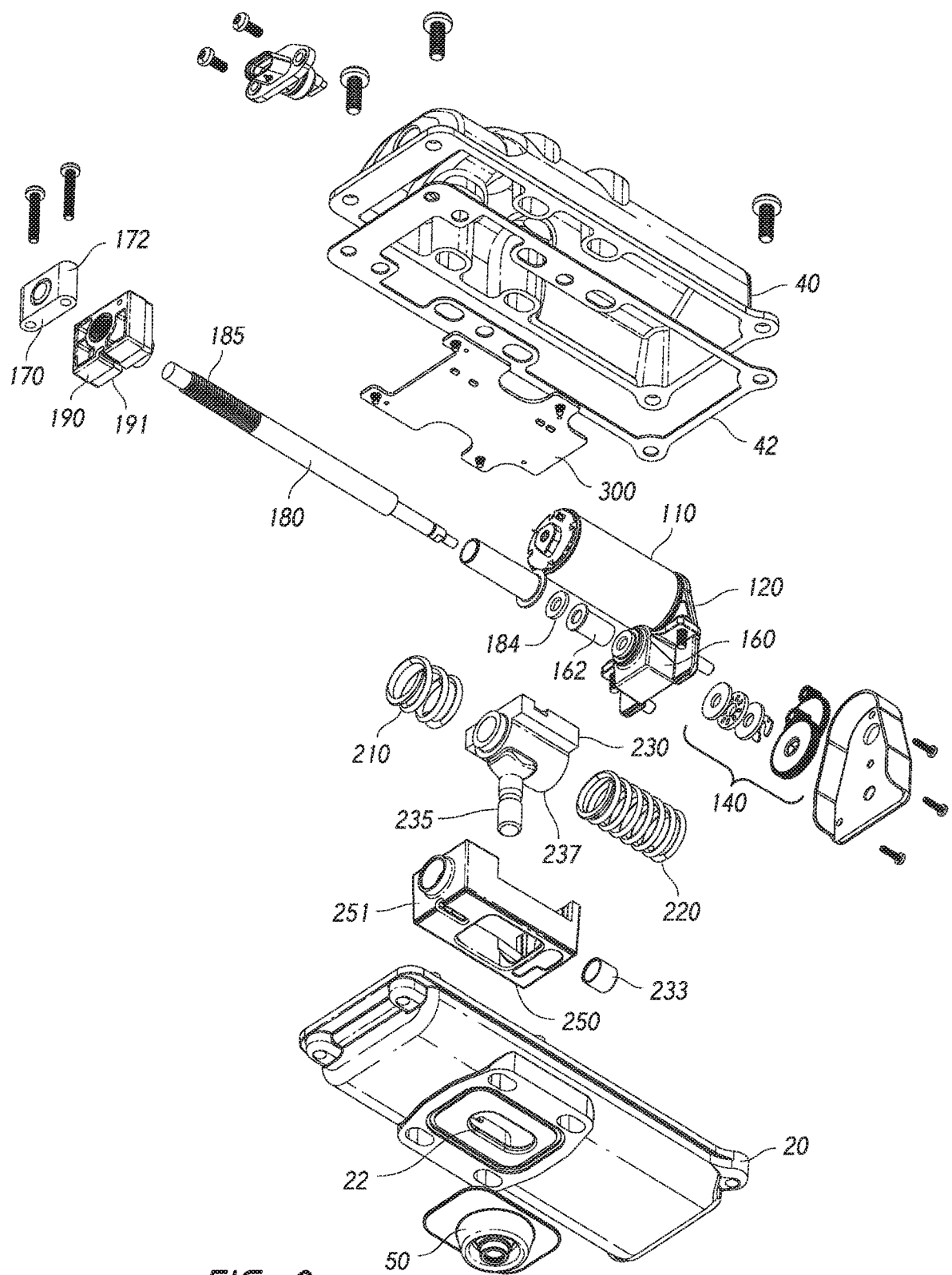
FIG. 2 is an exploded perspective view from a lower vantage point of the example actuator of FIG. 1.
Figure 3:
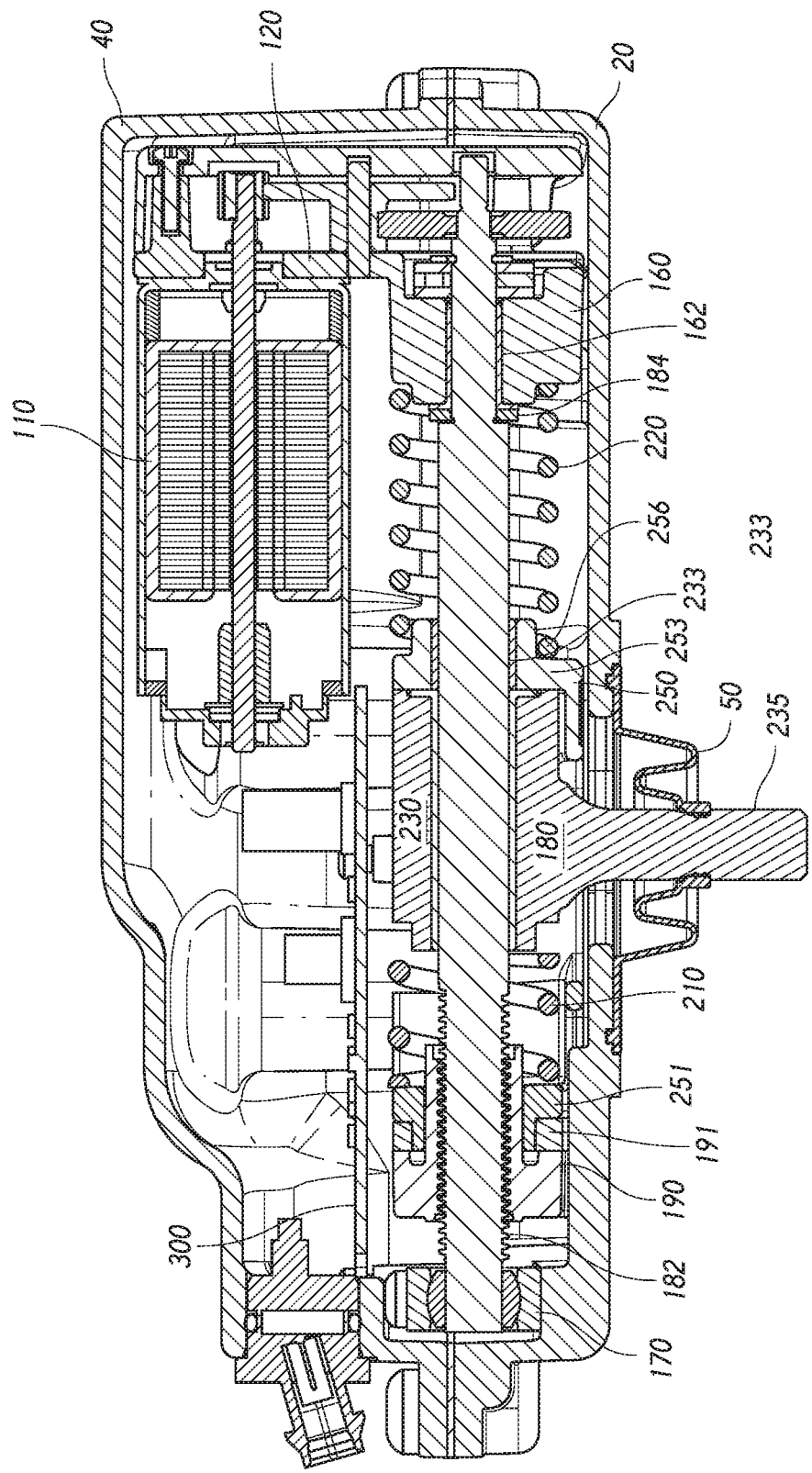
FIG. 3 is a cross-section of the assembled example actuator of FIGS. 1 and 2, the section being taken along a vertical plane thru an axis of the lead screw.

An example actuator according to aspects of the disclosure will be explained with initial reference to FIGS. 1-3. FIGS. 1 and 2 depict exploded views, and FIG. 3 depicts an assembled cross-sectional view of an example actuator. Components may be contained within a housing, which may include a housing base 20 and a housing cover 40 secured together with threaded fasteners and defining an interior space. Sealing elements, such as a gasket 42 and boot 50 may seal the housing interior space against contamination. The interior space may house a number of subassemblies, including a lead screw drive assembly 100, actuator pin assembly 200, and an electronic control unit (ECU) 300. Each of these assemblies will be explained below.

Lead screw drive assembly 100 may include an electric motor 110 secured to a motor mount 120 and including a motor shaft coupled to power transmission elements in a powertrain or gearbox 140. A gearbox cover 130 may seal and support the power transmission elements 140. Gear ratios may be selected to achieve a desired reduction in speed and increase in torque as is known in the art. Motor mount 120 may have secured thereto a first lead screw mount 160, including a journal or bore 162 for supporting one end of a lead screw 180 for rotating movement. An opposite end of lead screw 180 may be supported for rotating movement in a second lead screw mount 170 also having a bore 172. Bearing and lubricating elements may be provided in a manner that is known in the art. Lead screw 180 may include a threaded portion 182 which engages a lead screw nut 190 such that rotation of the lead screw 180 results in lateral displacement of the lead screw nut 190. Lead screw 180 may include one or more bearing washers 184 which may operate as thrust bearings to counter axial forces on the lead screw 180.

Figure 4:
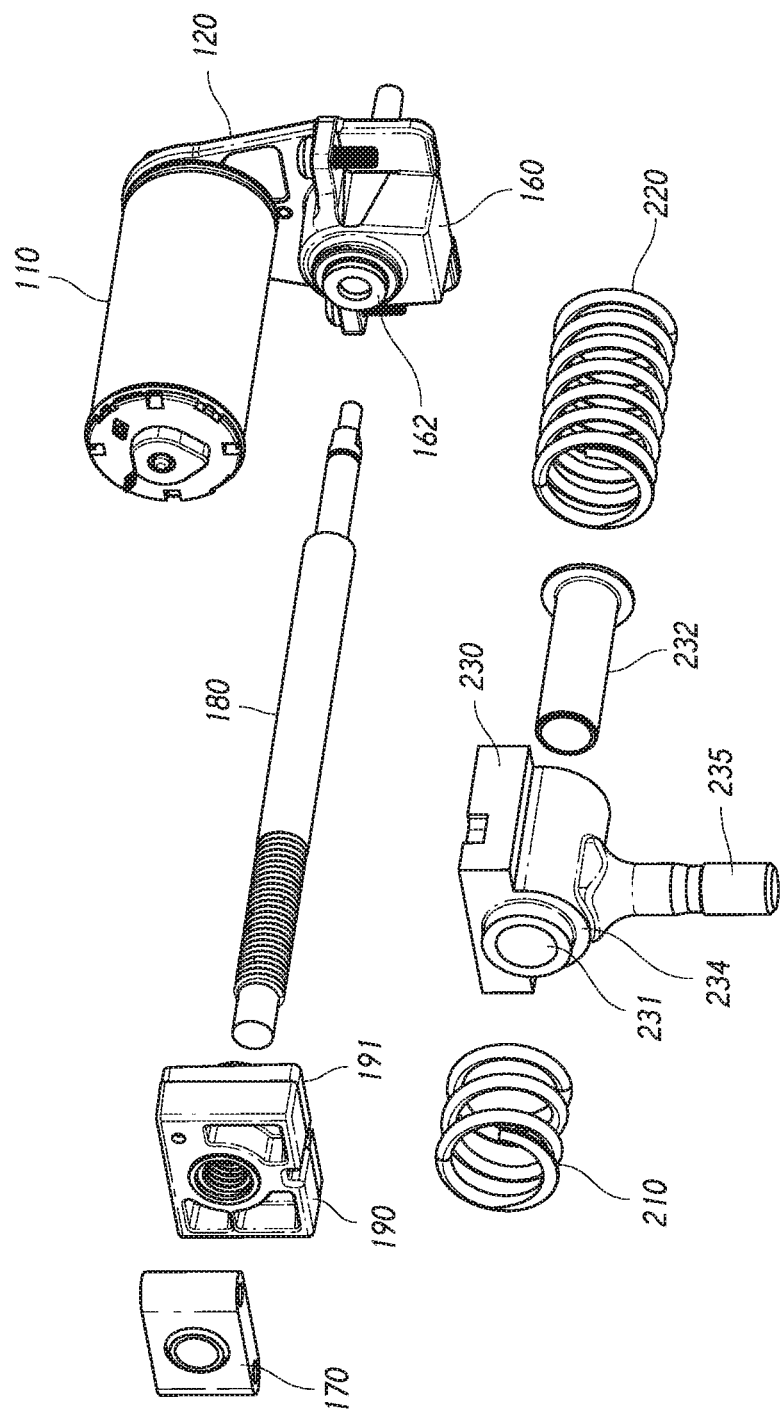
FIG. 4 is a detailed perspective of an example lead screw and actuating pin mounting configuration.
Figure 5:
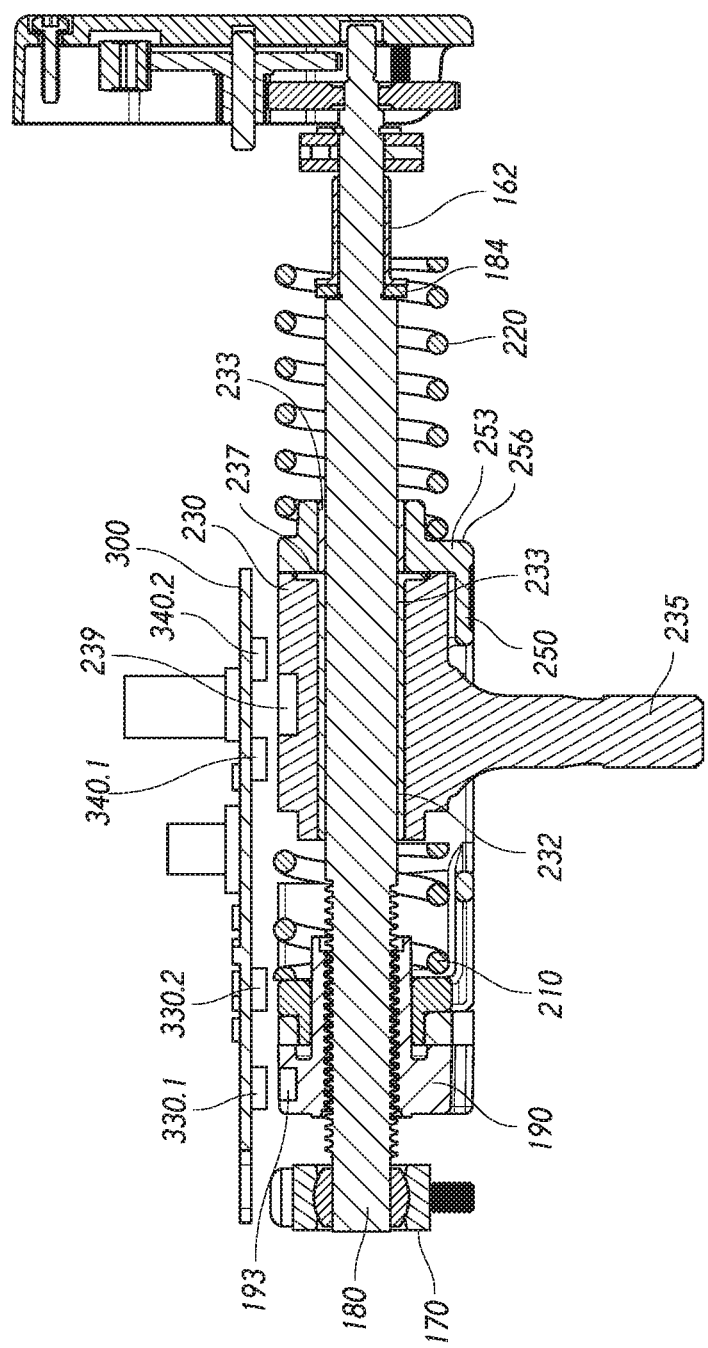
FIG. 5 is a cross-section of the assembled lead screw and drive pin mounting configuration of FIG. 4.

Referring additionally to FIGS. 4 and 5, lead screw nut 190 may be resiliently coupled to an actuator pin body 230, which may be mounted for sliding movement on the lead screw 180 by way of a laterally extending bore 231, which may receive a collar 232. Actuator pin body 230 is positioned on the lead screw and within a nut guide 250. A first biasing element, which may be a spring 210 is positioned within the nut guide 250, between a first end wall 251 of nut guide 250 and a shoulder 234 of the actuator pin body 230. Nut guide 250 may have a second end wall 253 and each end wall of the nut guide 250 may have a nut guide end wall bore therein. As the lead screw nut 190 moves in a locking direction (to the right in FIGS. 1-5) spring 210 thus provides a biasing force in the same direction (to the right in FIGS. 1-5) and a resilient coupling between the nut guide 250 and the actuator pin body 230. For additional resilient coupling, a damper element 191, which may be made of an elastomeric material, may be positioned adjacent the nut 190 to provide a resilient coupling between the nut 190 and the first end wall 251 of the nut guide 250. In this manner, the actuator pin body 230 is indirectly coupled to the nut guide and the lead screw nut 190 such that, in a tooth-on-tooth condition, actuator pin body 230 may resist movement in the locking direction as the lead screw 180 continues to rotate and as the lead screw nut 190 and nut guide 250 continue to move, compressing spring 210 until the tooth-on-tooth condition no longer exists. Collar 232 may be a friction reducing elements and may be secured within the bore 231 to provide for stable and smooth movement of the actuator pin body 230. Additional friction reducing elements, such as bushings 233 may be provided in the end wall bores of nut guide 250 to provide for stable sliding movement of the nut guide 250 on the non-threaded portion of lead screw 180. As best seen in FIG. 5, an end 237 of actuator pin body 230 may engage and abut an interior surface of second end wall 253 of nut guide 250. A second biasing element, which may be a spring 220, may engage a shoulder 256 on an exterior surface of second end wall 253 of nut guide 250. Spring 220 thus provides a biasing force on the nut guide 250 and actuator pin body 230 in a direction opposite locking direction and opposite the force of biasing element 210. Housing base 20 may include a slot 22 (FIG. 2), which provides for movement of an actuating pin 235, which extends from the actuator housing for engaging a cooperating element on the differential (not shown) for locking and unlocking the same.

Sensing and Control Configurations

Figure 6:
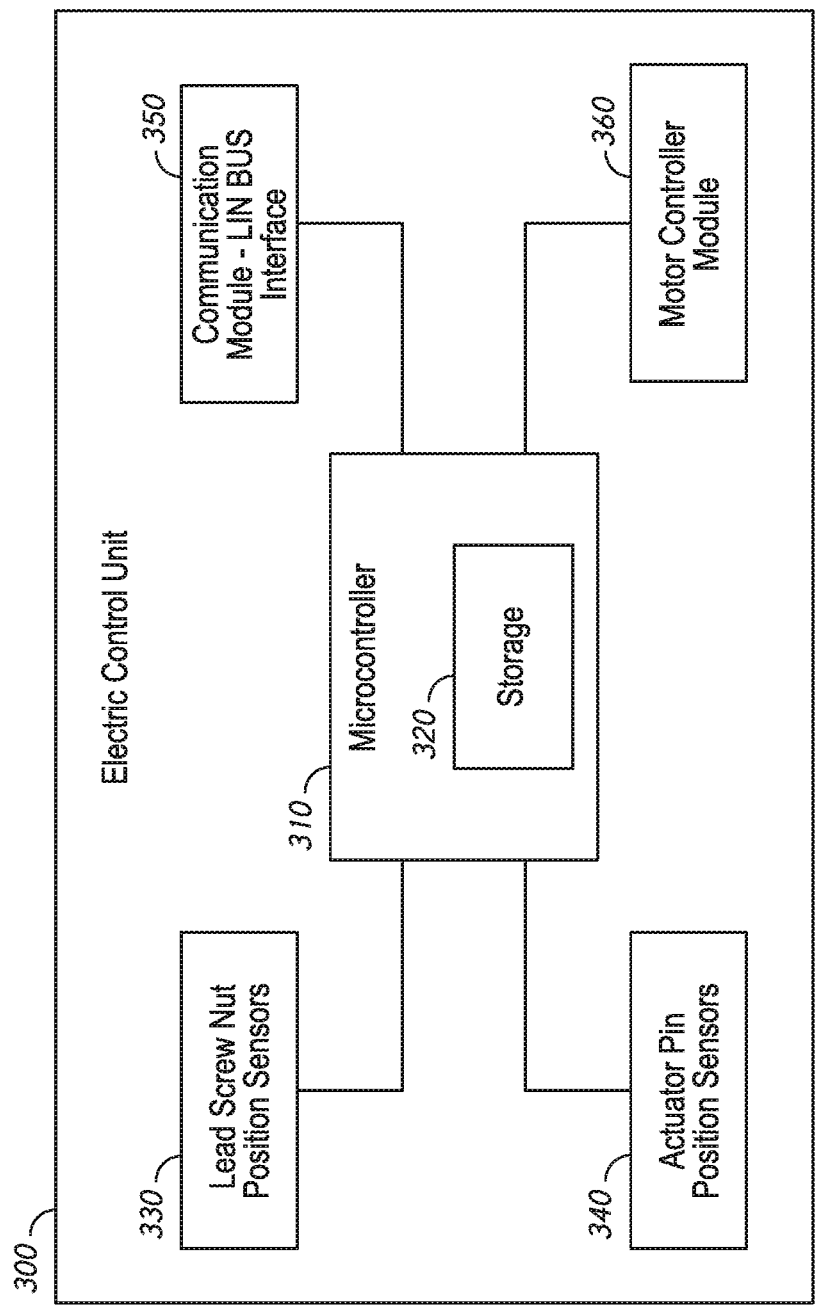
FIG. 6 is a block diagram of an example electronic control unit.

FIG. 6 is a block diagram illustrating example components of an ECU 300 according to aspects of the disclosure. The ECU may be built around a microcontroller 310 which includes a storage 320 for storing data representing instructions and numerical data/control parameters. A number of lead screw nut position sensors 330 may communicate electronically with microcontroller 310 via a data bus or other communication links as known in the art. A number of actuator pin position sensors 340 may also communicate with microcontroller 310 in a similar fashion. A communication module 350 may be a Local Interconnect Network or LIN BUS interface to the onboard communications system for a vehicle. ECU 300 may include a motor control module 360 for controlling the motor 110 (FIGS. 1-5) in a manner that will be described.

Figure 7:
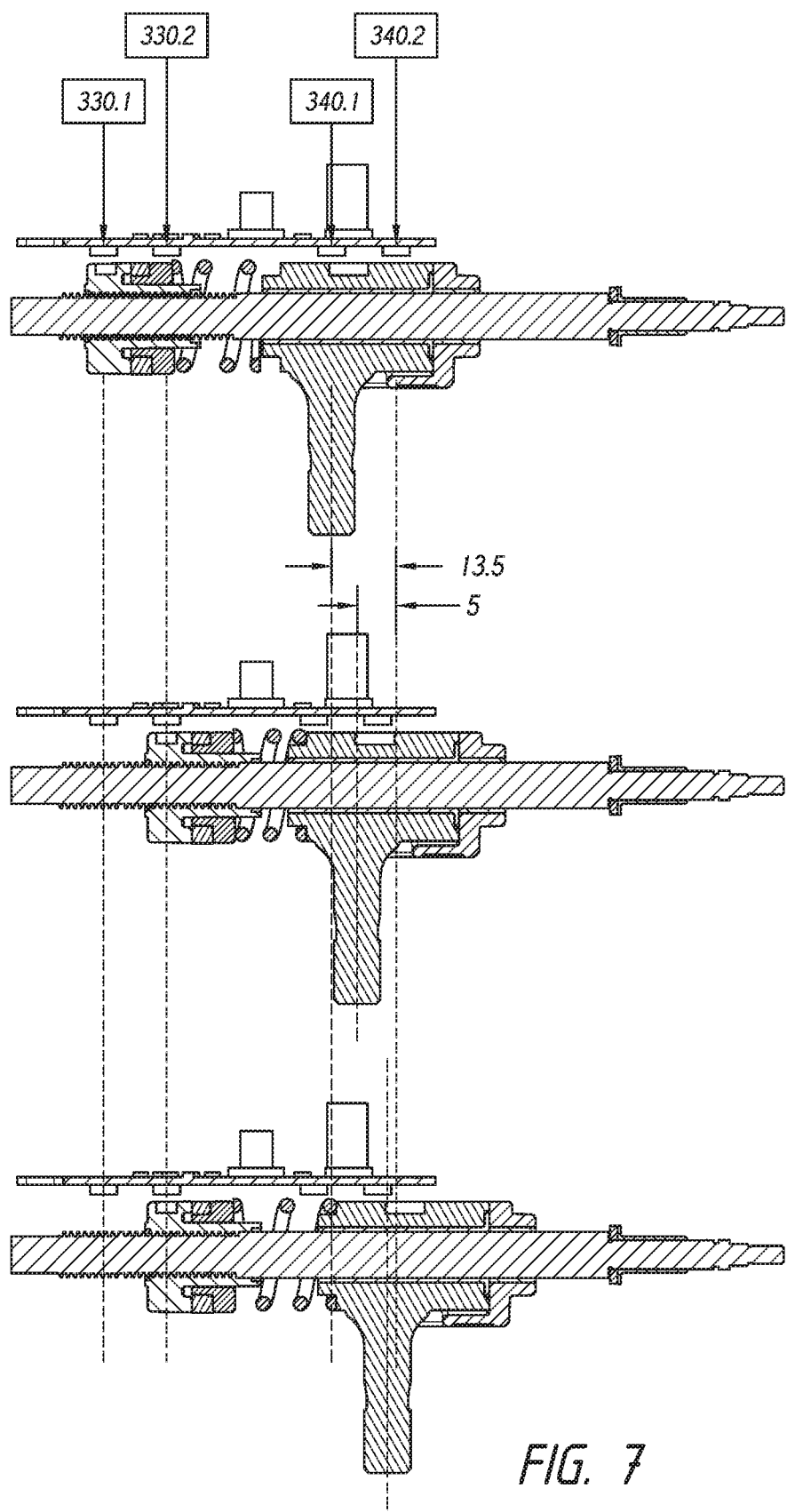
FIG. 7 is a schematic diagram of an example sensing configuration.

According to an aspect of the disclosure, the actuator may include a sensing configuration for sensing a number of different states of the actuator and associated states of the differential unit. FIG. 7 schematically depicts an example sensing configuration for sensing four different states of the actuator. Sensors 330.1, 330.2, 340.1 and 340.2 may be reed switches, contact sensors, inductive sensors or other suitable sensors known in the art provided within the actuator for sensing positions of the lead screw nut 190 and the actuating pin 235. Sensors 330.1 and 330.2 may sense the position of the lead screw nut 190, and sensors 340.1 and 340.2 may sense the position of the actuator pin body 230. Referring additionally to FIG. 5, sensors 330.1 and 330.2 may be mounted on the underside of the ECU and positioned to sense, inductively or otherwise a magnetic element 193 on the lead screw nut 190. Similarly, sensors 340.1 and 340.2 may be mounted on the underside of the ECU and positioned to sense, inductively or otherwise, a magnetic element 239 on the actuator pin body 230. Using this example configuration of FIG. 7, multiple states of the actuator may be determined. The sensor 330.1 may be located at an unlocked position of the lead screw nut 190. Sensor 330.2 may be located at a locked position of the lead screw nut 190. The "locked" position may, for example, correspond to where the lead screw nut 190 is positioned when the actuator pin 235 is deployed to a locked position under normal differential locking operation. Similarly, the "unlocked" position may correspond to where the lead screw nut 190 is positioned when the actuator pin 235 is in a full retracted position and the differential is unlocked. Additional sensors 340.1 and 340.2 may be positioned to simultaneously sense unlocked and locked positions of the actuator pin 235.

Multiple states of the actuator may be sensed using the example logic in TABLE A in which the term "closed" refers to the state of detecting the presence of the monitored item as in the case of a switch-type sensor being closed, and in which the term "open" refers to the state of not detecting the presence of the monitored item as in the case of switch-type sensor being opened:

TABLE A

| Actuator State | Sensor States | | | |
|---|---|---|---|---|
| | 330.1 | 330.2 | 340.1 | 340.2 |
| Unlocked | Closed | Open | Closed | Open |
| Ready to Lock (Tooth to tooth) | Open | Closed | Open | Open |
| Locked | Open | Closed | Open | Closed |
| Ready to Unlock | Closed | Open | Open | Closed |

Using the above control logic, multiple states of the actuator may be determined and conveyed to onboard communication and control systems via ECU 300. These states may include a ready to lock (tooth to tooth) status whereby modifications to the actuation control algorithms may be made to prevent undue forces from being applied to the actuator where the differential gears are not yet properly meshed. For example, in the case of the determined state being ready to lock (tooth on tooth), a motive force applied by the motor 110 to the lead screw 180 can be adjusted by altering the current and/or voltage applied to the motor 110 such that rotation of the lead screw 180 is decreased.

Motor Control

Figure 8:
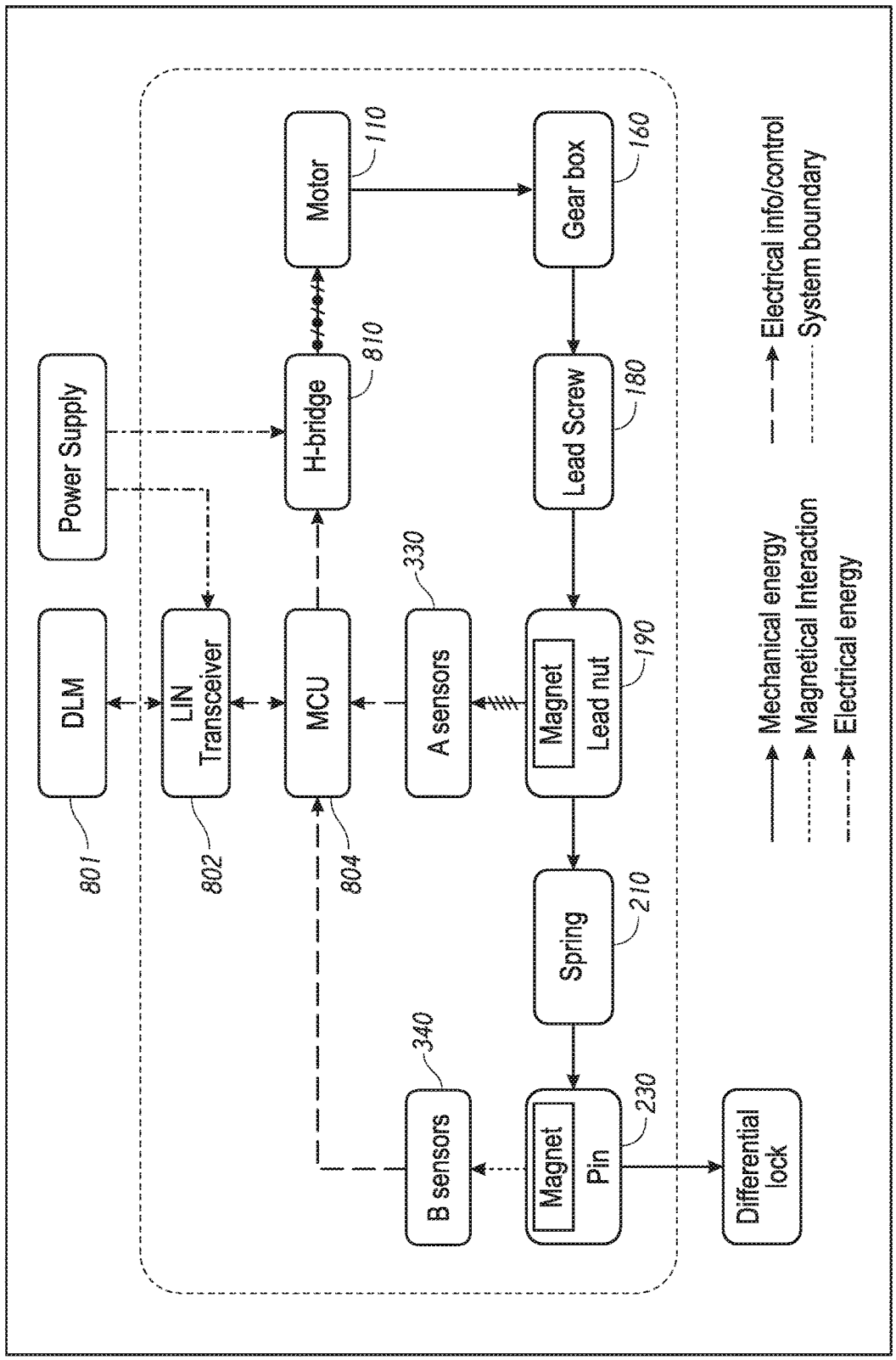
FIG. 8 is block diagram showing an example control system.

FIG. 8 is a block diagram showing an example motor control system. A LIN-BUS transceiver 802 may receive control information from a data link monitor (DLM) 801 and communicate control information to an actuator motor control unit (MCU) 804. Sensors 330, which may correspond to the above-described sensors 330.1 and 330.2 (FIG. 7) sense the position of lead screw nut 190. Sensors 340 similarly sense the position of actuator pin 230, MCU 804 may convey information and/or signals to an H-bridge 810 which supplies voltage to motor 110 and may change polarity to facilitate direction changes. FIG. 8 also represents the physical, mechanical linkages between the gear box 160, lead screw 180, lead nut 190, biasing element or spring 210 and actuator pin 230, according to aspects of the disclosure.

Figure 9:
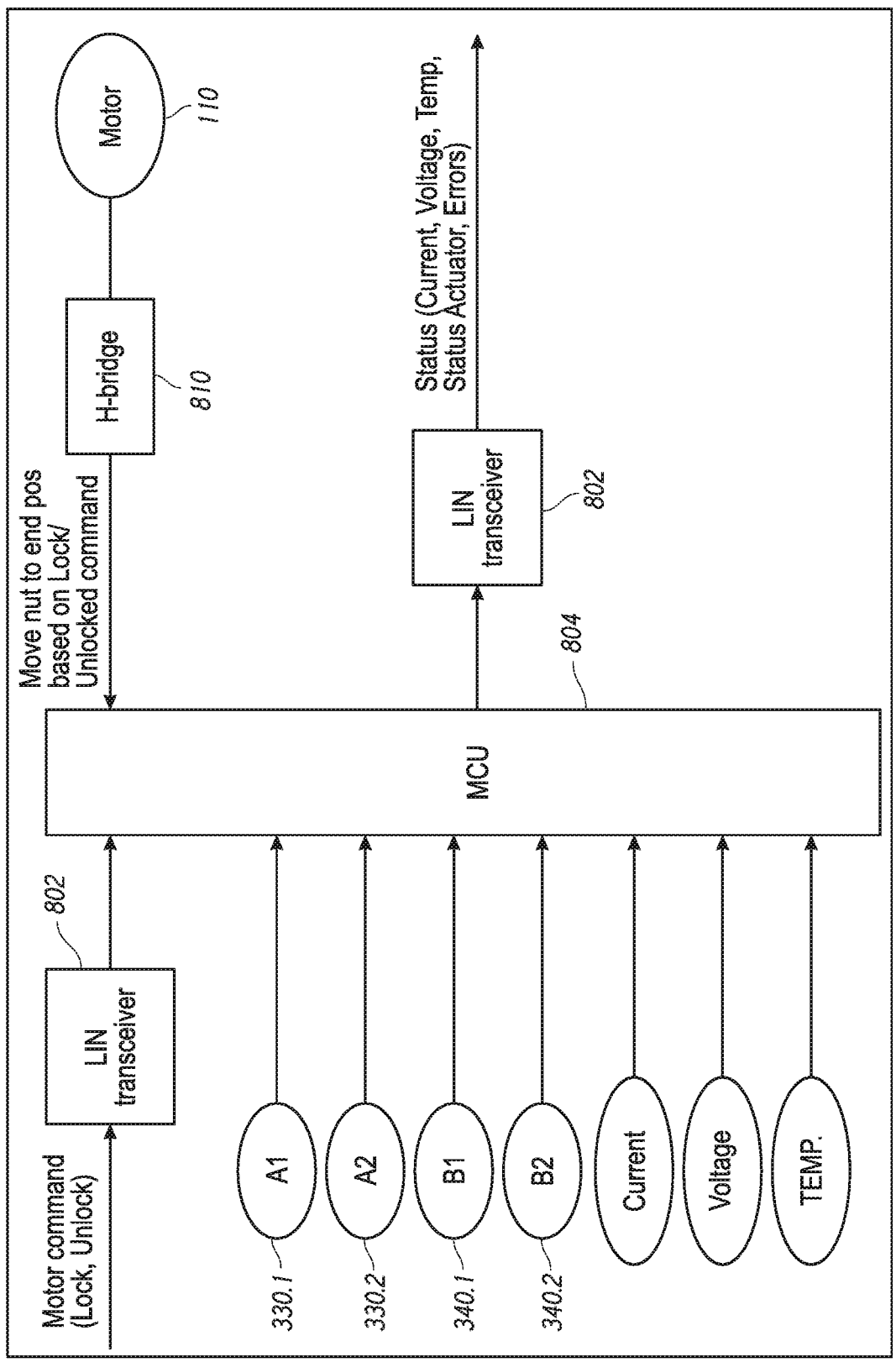
FIG. 9 is a block diagram showing input and output commands to an example motor control unit.

FIG. 9 is a block diagram showing input and output commands to an example motor control unit. Lock/unlock commands may be received via LIN-BUS transceiver. The actuator states may be determined based on the states of sensors 330.1, 330.2, 340.1 and 340.2 as input to the MCU and according to the logic reflected in TABLE A above. The sensor states as well as current, voltage and temperature information may be input to the MCU and signals and/or information may be sent the H-bridge 810 to control motor 110 appropriately. Status information regarding current, voltage, temperature, actuator status and error conditions may be conveyed from the MCU via the LIN-BUS transceiver 802 to vehicle systems.

Failsafe Configurations

According to aspects of the disclosure, features are provided to ensure a failsafe condition for differential locking actuators. These failsafe features provide for disengagement of the differential lock in the event power is lost to the actuator.

Figure 10:
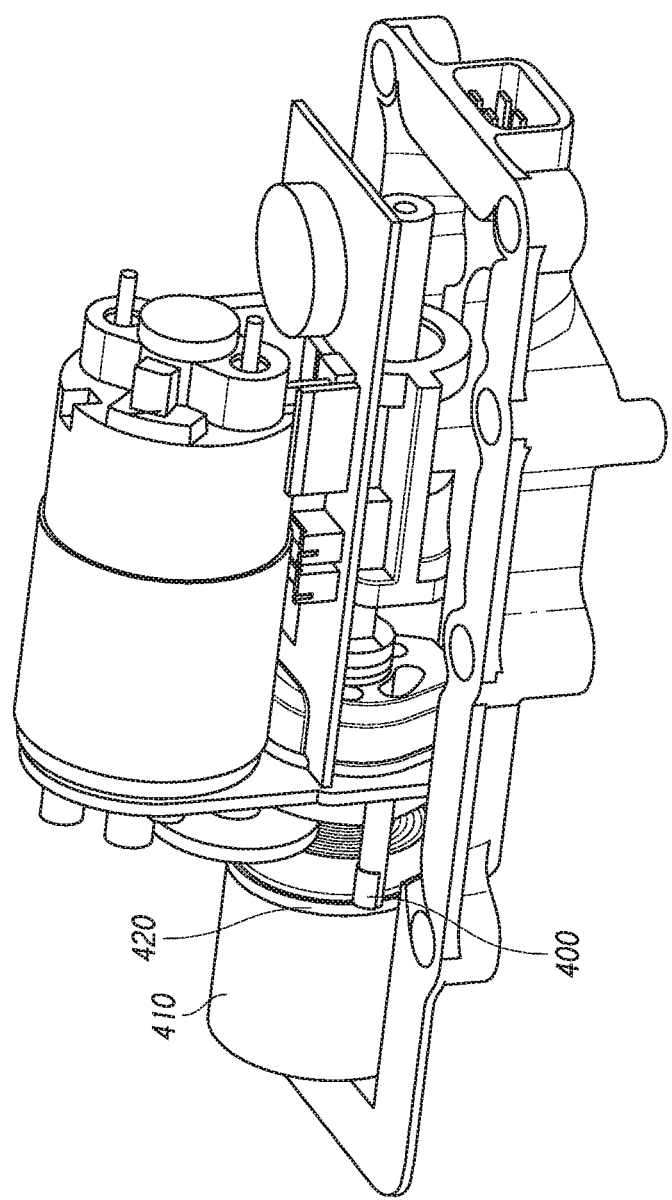
FIG. 10 is a perspective view of an example automatic failsafe mechanism.

FIG. 10 illustrates a failsafe feature for automatically disengaging the actuator in the event of a power failure. During operation, when the actuator moves to a locked/engaged position, a motor spring (i.e., a clock spring) 400 is wound in synchrony with the lead screw 180 when the lead screw 180 is rotated to place the locked/engaged position to store energy that may be later used to return the actuator (and, consequently, the differential transmission) to an unlocked/disengaged position, in the event of a power loss. The motor spring 400 may be coupled to the lead screw 180 (FIGS. 1-5) and a friction disk 420. Once motor spring 400 has been wound, an electro-magnet 410 may be energized (under control of the ECU 300) to cause the friction disk 420 to engage and essentially provide a braking force against unloading of the motor spring 400 while in the locked/engaged state as long as power is supplied to the unit. When power loss occurs, the electro-magnet is de-energized and releases the friction disk 420 and the motor spring applies rotational force to the lead screw causing the lead screw nut to move to a disengaged/unlocked position. Absent a loss of power, and during unlocking/disengagement of the actuator, the motor spring force is used to move the lead screw and return the lead screw nut to an unlocked position.

Figure 11:
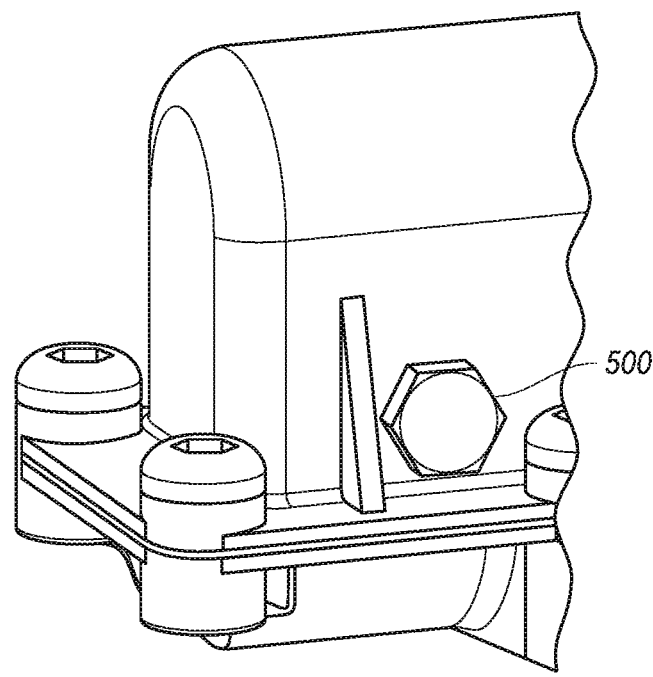
FIG. 11 depicts an example manual failsafe feature.
Figure 12:
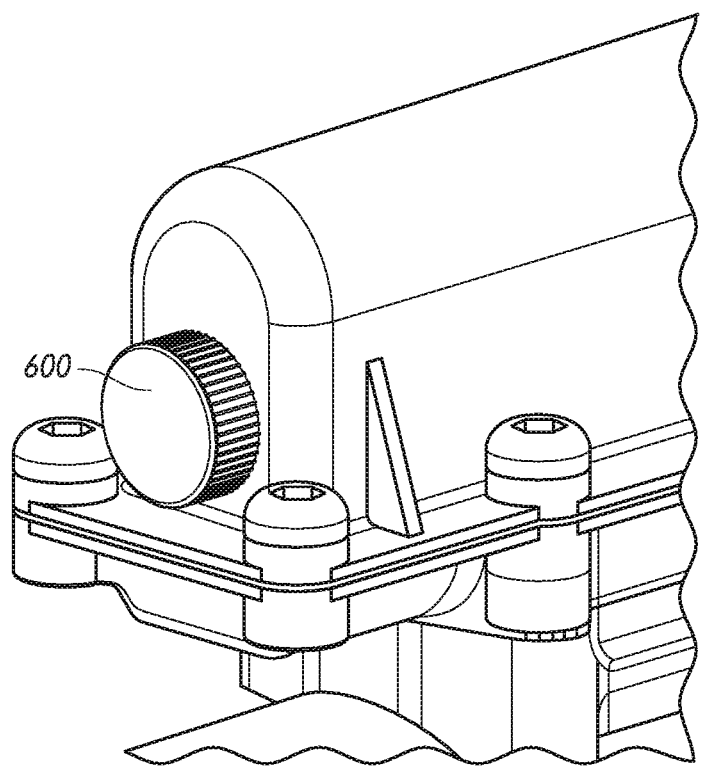
FIG. 12 depicts another example manual failsafe feature.

According to aspects of the disclosure, additional failsafe features may provide for user intervention, i.e., manual operation to cause the actuator to disengage from a locked position. FIG. 11 illustrates a threaded member 500 that extends into the interior of the housing and which may be removed or retracted to permit the actuating pin to return to a disengaged position. FIG. 12 illustrates another failsafe feature in which a turning knob 600 is accessible on the housing exterior and is directly coupled to the lead screw or to an intermediate gear to provide for manual turning of the lead screw and return of the lead screw nut to a disengaged position.

Although the present invention has been shown and described in detail the same is to be taken by way of example only and not by way of limitation. Numerous changes can be made to the embodiments shown without departing from the scope of the invention. The present invention may be further modified within the spirit and scope of this disclosure. The application is, therefore, intended to cover any variations, uses, or adaptations of the invention using its general principles. Further, this application is intended to cover such departures from the present disclosure as come within known or customary practice in the art to which this invention pertains.

The invention claimed is:
1. A differential lock actuating device comprising:
a housing;
a lead screw rotatably mounted within the housing;
a lead screw nut cooperating with the lead screw;
an actuating pin cooperating with the lead screw nut;

a resilient coupling between the lead screw nut and the actuating pin; and an electronic control unit including a first lead screw nut sensor for sensing a first position of the lead screw nut and a first actuating pin sensor for sensing a first position of the actuating pin.

2. The device of claim 1, further comprising an actuating pin body having a bore, the actuating pin extending from the actuating pin body wherein the lead screw extends thru the bore of the actuating pin body.

3. The device of claim 1, further comprising a nut guide having opposed nut guide end walls, each nut guide end wall having a nut guide wall bore, the lead screw extending thru each of the nut guide wall bores.

4. The device of claim 1, wherein the resilient coupling comprises a spring.

5. The device of claim 1, further comprising:
an actuating pin body having a bore, the actuating pin extending from the actuating pin body wherein the lead screw extends thin the bore of the actuating pin body;
a nut guide having opposed nut guide end walls, each nut guide end wall having a nut guide wall bore, the lead screw extending thru each of the nut guide wall bores;
and wherein the resilient coupling comprises a spring positioned between one of the nut guide end walls and the actuating pin body.

6. The device of claim 5, wherein the spring is positioned concentrically with the lead screw.

7. The device of claim 5, wherein the resilient coupling further comprises an elastomeric element positioned between the lead screw nut and one of the nut guide end walls.

8. The device of claim 1, further comprising a second lead screw nut sensor for sensing a second position of the lead screw nut and a second actuating pin sensor for sensing a second position of the actuating pin.

9. The device of claim 1, wherein the electronic control unit includes a microcontroller for receiving information from the first lead screw nut sensor and the first actuating pin sensor and determines a tooth-on-tooth condition of the differential lock based on the received information.

10. A method of operating a differential lock actuating device, the differential lock actuating device comprising: a housing; a lead screw rotatably mounted within the housing;
a lead screw nut cooperating with the lead screw; an actuating pin cooperating with the lead screw nut; a resilient coupling between the lead screw nut and the actuating pin; and an electronic control unit including a first lead screw nut sensor for sensing, a first position of the lead screw nut and a first actuating pin sensor for sensing a first position of the actuating pin, the method comprising:

rotating the lead screw to cause the lead screw nut to move in a locking direction;

transmitting force from the lead screw nut to the actuating pin through the resilient coupling;

sensing the position of the lead screw nut;

sensing the position of the actuating pin; and determining a state of the actuator based on the sensed positions of the lead screw nut and actuating pin.

11. The method of claim 10, wherein the step of determining a state of the actuator comprises determining that the actuator has experienced a tooth-on-tooth condition of a differential.

12. The method of claim 10, wherein the step of determining a state of the actuator comprises determining that the actuator is in a locked state corresponding to a locked condition of a differential.

13. The method of claim 10, further comprising the step of determining a state of the actuator comprises determining that the actuator is in an unlocked state.

14. The method of claim 10, further comprising the step of adjusting a motive force applied to the lead screw based on the determined state of the actuator.

\* \* \* \* \*